UNITED STATES PATENT OFFICE.

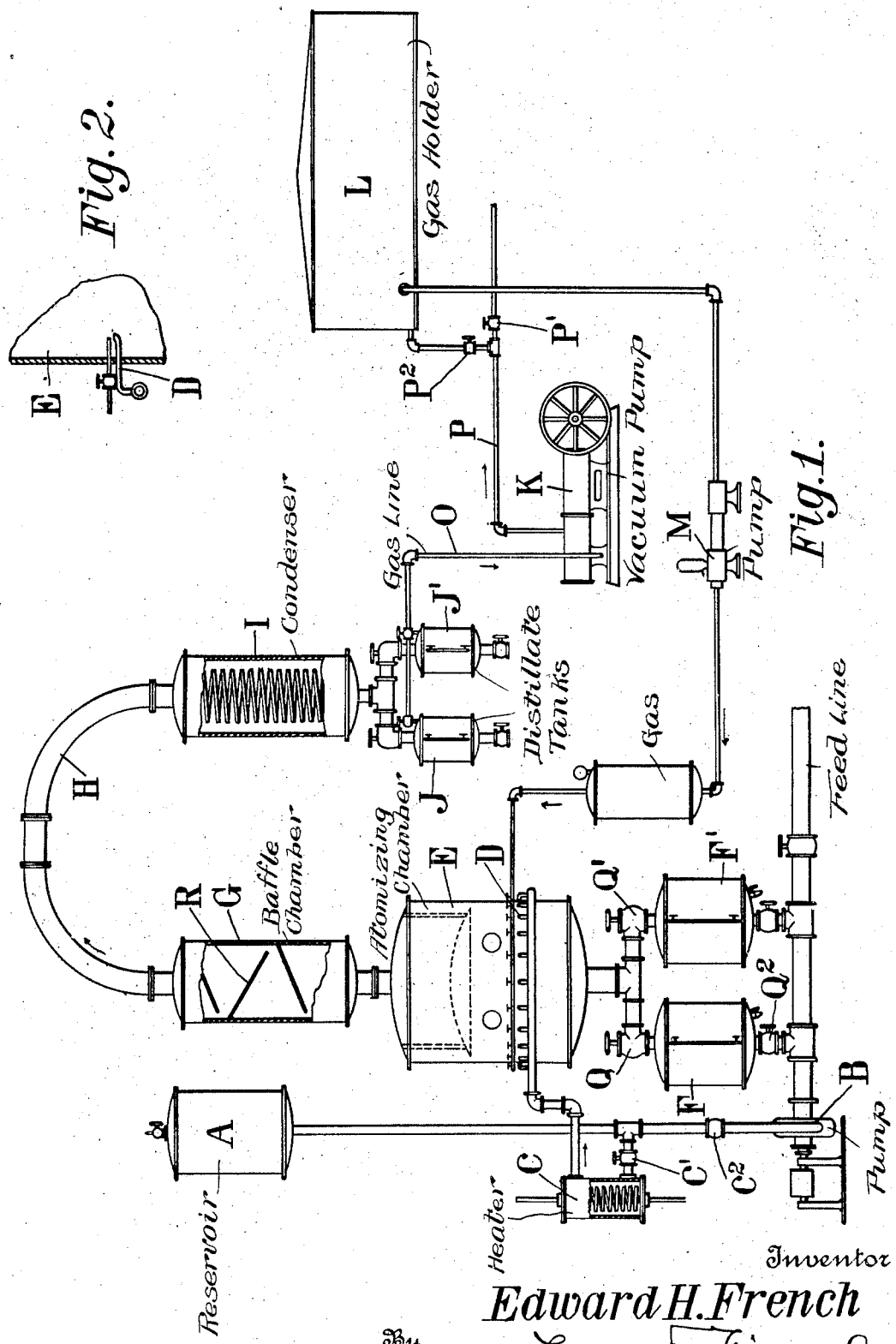

EDWARD H. FRENCH, OF KINGSPORT, TENNESSEE.

PROCESS OF FRACTIONALLY DISTILLING MIXTURES CONTAINING HYDROCARBONS.

1,394,488.     Specification of Letters Patent.     Patented Oct. 18, 1921.

Application filed July 10, 1919. Serial No. 309,848.

*To all whom it may concern:*

Be it known that I, EDWARD H. FRENCH, a citizen of the United States, residing at Kingsport, in the county of Sullivan and State of Tennessee, have invented a certain new and useful Improvement in Process of Fractionally Distilling Mixtures Containing Hydrocarbons, of which the following is a specification.

It is desirable and often necessary in evaporating or distilling certain products to reduce the temperature at which evaporation or distillation takes place, in order to prevent the decomposition of either the distillate or residue, and the consequent formation of objectionable or secondary products. The formation of such decomposition products takes place in the evaporation and distillation of many substances, such as petroleum, coal tar and pyroligneous acid. The solid coke residue found in petroleum and coal tar stills under ordinary distillation being a well known illustration.

In the attempt to lessen or prevent this decomposition several different methods of distillation and evaporation are used, for example, vacuum distillation and evaporation, steam distillation and passing air or gas through a liquid, thus reducing its evaporating point. While these methods may lessen objectionable decomposition yet considerable does take place in the distillation and evaporation of many substances.

In the ordinary methods of distillation the material is maintained in the heat zone continuously thereby causing a maximum decomposition. In my process this is avoided.

The rate of evaporation and distillation is dependent upon the amount of surface of liquid. In the ordinary methods the time required for the vaporization of any fraction is necessarily so long as to allow of objectionable decomposition in the remaining material. In my process I secure a maximum surface by finely dividing the liquid supplied to the still by means of atomization.

In addition, I aid evaporation by means of the gas used in atomizing the liquid into the still body. The distillation may also be promoted with a vacuum. As before indicated in progressively removing the distillation fractions in the usual methods employed it is necessary to maintain the entire mixture at a progressively increasing temperature which is equal to or above the boiling point of the fraction distilled. In my process as herein particularly described I am able to vaporize each fraction at a point below its average boiling point in the mixture, the higher fractions immediately dropping out of the heat zone which includes the preheater and still body, thus preventing the decomposition caused by the continuous heating of the mixture.

I am thus able to combine and utilize five important physical conditions which effect evaporation and distillation, (1) low temperature of evaporation, (2) continuous removal of material from the heat zone, (3) a maximum surface for evaporation, (4) the carrying properties of a gas, (5) aid with a vacuum when desired.

As will be explained my process is of particular value in fractional distillation of complex mixtures such as petroleum, in which the various fractions can be removed progressively, without the usual decomposition and consequent formation of permanent gases. In fractionating petroleum or other mixtures the temperature of the preheater in my process is made to conform to the boiling points of the components of the constituents of the mixture. In all instances this temperature is below the boiling point of the fraction to be removed.

In the accompanying illustrations—

Figure 1 shows diagrammatically the apparatus that may be used in carrying out the process.

Fig. 2 is a detail of one of the atomizers.

The character E designates the body of a still equipped with atomizing or spraying nozzles D. At G is a catcher or chamber having a baffle R and catcher G placed in the vapor line for removing any large particles of entrained matter. H is a vapor line to condenser I which leads to receivers J and J' which receive the distillate. O is a vapor line for the non-condensing vapors and atomized vapors leading to vacuum pump K which discharges either through pipe P into the air or into gas tank L and from which pump M draws its supply of gas for the purpose of atomizing the liquid into the chamber at D. It should be explained at this point that I have found it unnecessary to atomize by means of a gas in all instances. With some materials a finely divided mechanical spray alone will suffice to give the desired results. In such case a vacuum pump of as large a capacity as in cases where atomization by gas is used would not be required. F and F' are receivers for the reception of that fraction which is not volatilized in the first spraying and from which pump B again pumps or circulates the liquor.

In practice the product to be distilled is drawn from the storage tank through pump B into receiver A where it is pumped through heater C thence through nozzle D into chamber E. In said chamber the lower fractions are volatilized and passed through catcher G through vapor line H and condenser I and thence into tank J or J', all of which are under vacuum produced by pump K. The higher fraction which is not volatilized drops down in chamber F or F'. After all the material in A has passed through chamber E and the higher fraction removed and its residue passed into F or F' the valve at Q is closed and the valve Q² opened to supply the material to be pumped to A and F' acts as a receiver for the second or next progressive residue. In this manner and by regulating the speed of entrance of material into chamber E and the temperature of heater C an accurate fractionation can be secured. From the construction shown it will be observed that because the mixture is passed in a continuous stream through the preheater C only a relatively small volume of the mixture is subjected to heat at one time, and since the heat of the preheater C and heater G can be regulated, the mixture can be subjected to just that degree of heat necessary to vaporize and remove the fraction desired to be distilled, thereby avoiding decomposition either of the mixture itself or of the fraction to be removed. Moreover, the separating process is accelerated, and a fraction nearly free from added decomposition products obtained and the decomposition of the residue prevented. Because the average boiling point varies in different mixtures of hydrocarbons, no specific boiling point for any of the fractions could be stated, hence in the practical use of the process, the heat to be used is determined and regulated in each instance by observing the distillate from the condenser. When, for example, in distilling gasolene from crude oil, the run from the condenser shows the material to meet commercial requirements, the rate of flow and temperature are set to continue the production of the same until the fraction is removed from the whole.

In initiating the process the air is first exhausted from the system of apparatus through pipe P and then valve P' is closed and the valve P² opened so that upon the operation of pump M gas is taken from tank L and returned to tank L through valve P².

A valve at C' can be closed when reservoir A is charged.

A check valve at C² prevents the return of liquid from reservoir A.

Other valves and conventional parts can be employed as shown.

The forms of the parts used in carrying out the process can be changed without departing from the gist of the invention as claimed.

What I claim is—

1. In the process of fractionally distilling a complex liquid mixture containing hydrocarbons, heating such liquid in transit from a reservoir to a temperature below the average boiling point of the fraction to be distilled while in the mixture but sufficiently to vaporize such fraction from the mixture upon atomization with an inert gas, immediately subjecting the thus heated mixture to such atomization with an inert gas in a separating chamber, condensing the vaporized fraction and promptly removing the residue from said chamber.

2. In the process of fractionally distilling a complex liquid mixture containing hydrocarbon, heating such liquid in transit from a reservoir to a temperature below the average boiling point of the fraction to be distilled while in the mixture but sufficiently to vaporize such fraction upon atomization in a vacuumized separator, immediately subjecting the thus heated mixture to atomization in a vacuumized separating chamber, condensing the vaporized fraction and promptly removing the residue from said chamber.

3. In the process of fractionally distilling a complex liquid mixture containing hydrocarbon, heating such liquid in transit from a reservoir to a temperature below the average boiling point of the fraction to be distilled while in the mixture but sufficiently to vaporize such fraction from the mixture upon atomization with an inert gas, immediately subjecting the thus heated mixture to such atomization with an inert gas, in an unheated separating chamber, condensing the vaporized fraction and promptly removing the residue from said chamber.

4. In the process of fractionally distilling a complex liquid mixture containing hydrocarbons, heating such liquid in transit from a reservoir to a temperature below the average boiling point of the fraction to be distilled while in the mixture but sufficiently to vaporize such fraction from the mixture upon atomization with an inert gas, immediately subjecting the thus heated mixture to atomization with an inert gas in a vacuumized separating chamber, condensing the vaporized fraction and promptly removing the residue from said chamber.

5. In the process of fractionally distilling a complex liquid mixture containing hyrocarbons, heating such liquid to a temperature below the average boiling point of the fraction to be distilled while in the mixture but sufficiently upon atomization with an inert gas to vaporize such fraction from the mixture, atomizing the same with an inert gas in a vacuumized chamber, condensing the vaporized fraction and promptly removing the residue from said chamber.

6. The process of fractionally distilling a complex liquid mixture containing hydrocarbons consisting in passing the liquid in a stream through a heater adapted to heat the liquid to a temperature below the average boiling point of the fraction to be distilled while in the mixture but sufficiently to vaporize such fraction from the mixture upon atomization in a vacuumized chamber, immediately subjecting the thus heated mixture to atomization in a vacuumized separating chamber, condensing the vaporized fraction and promptly removing the residue from said chamber.

7. The process of fractionally distilling a complex liquid mixture containing hydrocarbons consisting in passing the liquid in a stream through a heater adapted to heat the liquid to a temperature below the average boiling point of the fraction to be distilled while in the mixture but sufficiently to vaporize such fraction from the mixture upon atomization with an inert gas, immediately subjecting the thus heated mixture to atomization with an inert gas in a separating chamber, condensing the vaporized fraction and promptly removing the residue from said chamber.

8. The process of fractionally distilling a complex liquid mixture containing hydrocarbons consisting in passing the liquid in a stream through a heater adapted to heat the liquid to a temperature below the average boiling point of the fraction to be distilled while in the mixture but sufficiently to vaporize such fraction from the mixture upon atomization with an inert gas, immediately subjecting the thus heated mixture to atomization with an inert gas in a vacuumized separating chamber, condensing the vaporized fraction and promptly removing the residue from said chamber.

EDWARD H. FRENCH.